Sept. 17, 1957 R. W. HENNING ET AL 2,806,218
MUZZLE SHIELD FOR EXPLOSIVELY-ACTUATED TOOLS
Filed April 15, 1955 3 Sheets-Sheet 1
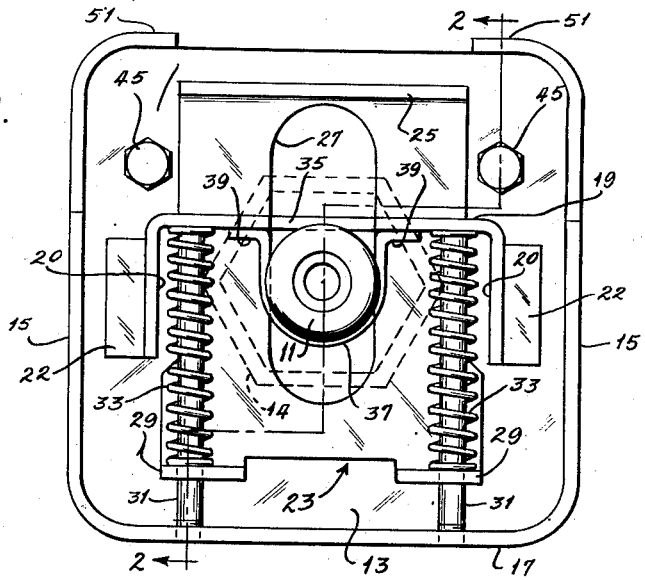
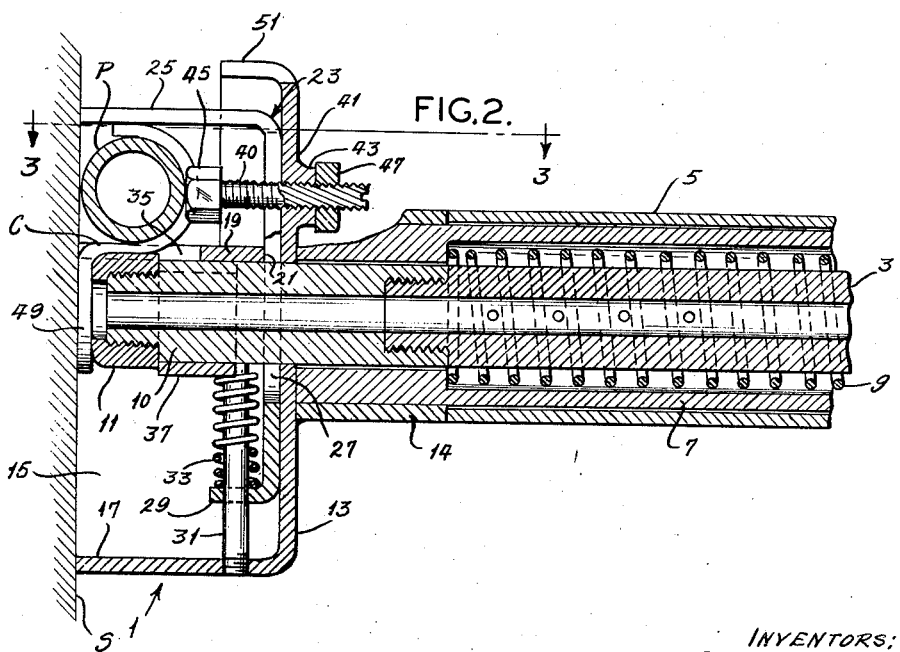
INVENTORS;
ROBERT W. HENNING
HERBERT L. IVINS
ROWLAND J. KOPF
ELMER F. PFAFF
By Bruninga and Sutherland,
ATTORNEYS.

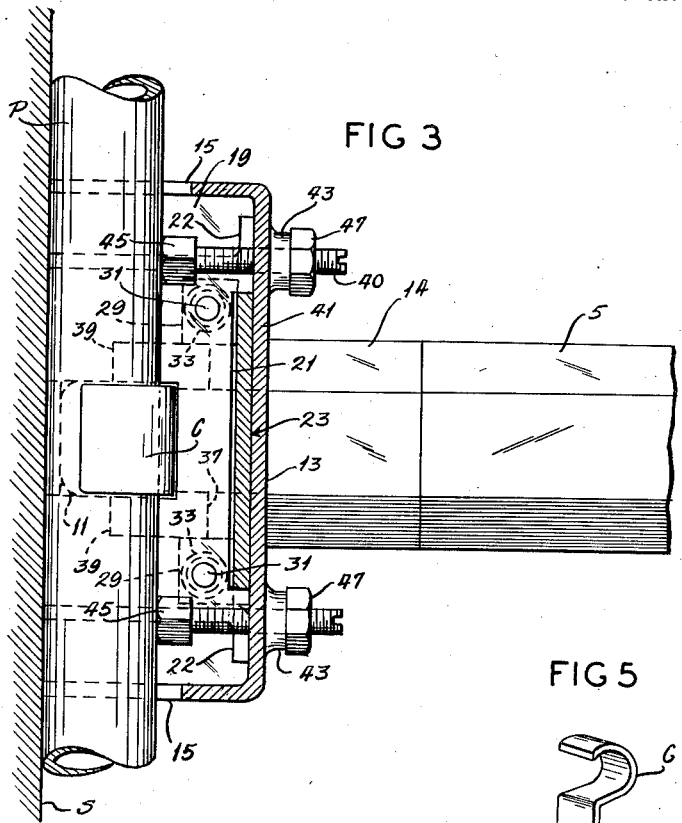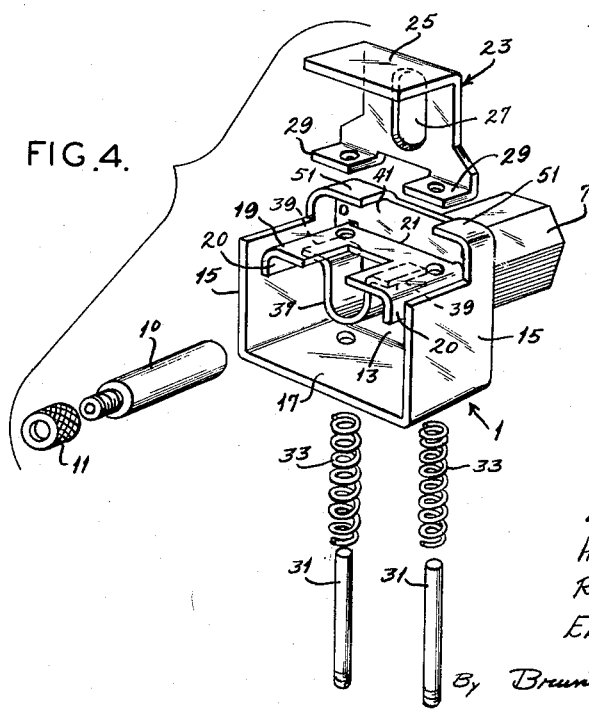

Sept. 17, 1957      R. W. HENNING ET AL      2,806,218
MUZZLE SHIELD FOR EXPLOSIVELY-ACTUATED TOOLS
Filed April 15, 1955      3 Sheets-Sheet 3

INVENTORS:
ROBERT W. HENNING
HERBERT L. IVINS
ROWLAND J. KOPF
ELMER F. PFAFF

By Bruninga and Sutherland,
ATTORNEYS,

United States Patent Office 2,806,218
Patented Sept. 17, 1957

2,806,218

MUZZLE SHIELD FOR EXPLOSIVELY-ACTUATED TOOLS

Robert W. Henning, Rocky River, Herbert L. Ivins, Cleveland, Rowland J. Kopf, Rocky River, and Elmer F. Pfaff, Mantua, Ohio, assignors, by mesne assignments, to Olin Mathieson Chemical Corporation, a corporation of Virginia Application April 15, 1955, Serial No. 501,624

9 Claims. (Cl. 1—44.5)

This invention relates to powder-actuated tools for driving fasteners, and more particularly, to a muzzle shield used in driving a fastener to secure a junction box, conduit holding clips and the like.

Customarily, conduit is held against a supporting structure by a clip formed with a C-shaped pipe-embracing section and an integral flat ear, which ear is secured against the supporting structure by a fastener. Savings in labor may be achieved by driving the fastener with an explosively-actuated tool, but the tool requires a muzzle shield somewhat different from that used in conventional types of work. The proximity of the muzzle to the conduit raises problems in properly locating the tool, holding the conduit against the supporting surface, holding the clip in proper position over the conduit, and confining muzzle blast.

Moreover, in jobs where electrical conduit is installed, the conduit is usually connected to junction boxes, which also must be attached to the supporting structure. Although, a junction box might be attached by exterior brackets, a more convenient procedure is that of driving a fastener through the back of the box using a powder-actuated tool and muzzle shield of the same type as that used in securing conduit clips.

Accordingly, the invention has as its objects the provision of a shield of the type described that is readily adjustable to different sizes and shapes of conduit, clips and junction boxes; the provision of a shield of this class that releasably holds a clip or junction box in proper position while providing a blast muffling chamber of adequately large, non-varying volume; the provision of a muzzle shield of the class referred to which permits conduit to be pressed against the supporting surface independently of the holding clip; the provision of a low-cost muzzle shield of the character described which is easy to make, install and operate; and the provision of such a shield wherein the muzzle of the barrel and the front of the shield are normally aligned, but have a telescoping cooperation that permits the shield to move rearwardly relative to the barrel to provide for a non-firing safety control in the event the barrel is inadvertently placed at an angle to the work surface.

More specifically, the invention contemplates that the muzzle shield will be formed with an apertured back wall and forwardly-projecting side walls along three sides thereof. The shield may be mounted on the tool by means of a rearwardly projecting tube fixed to the back of the shield and having a telescoping cooperation with the barrel housing. A standard tool may be used by lengthening the barrel with an extension, which extends through the back wall in spaced relationship from the aforesaid three side walls. These three side walls are adapted to engage the work, whereas the remaining side of the shield is defined in part by a muffling member extending adjacent the barrel and in part by a holding bracket mounted for lateral movement with respect to the barrel. The holding bracket in part extends outwardly from the partition and thence forwardly to the work surface so as to hold a conduit clip against the barrel or hold a junction box against the opposite side of the shield. The center portion of this bracket is guided within a slot remote from the front of the shield, and the inner portion of the bracket is biased away from the partition.

For example, a pair of guide rods may be affixed to extend on opposite sides of the barrel from the muffling member, the inner end of the bracket being slidably engaged on these rods with springs compressed on the rods against the muffling member. The barrel is accommodated within a stirrup secured upon this member, which member may extend to the front of the shield, except for a recess adjacent the muzzle where the clip is in part supported. A muzzle cap secured to the barrel extension preferably overlaps this stirrup to limit forward movement of the shield. In addition, the back of the box extends outwardly beyond the muffling member and the outer portion of the back carries conduit-engaging elements on opposite sides of the holding bracket, these elements preferably being adjustable in an axial direction relative to the barrel.

When a junction box is to be attached with the shield, the ends of the muffling member should be in spaced relationship from the side walls; and the outwardly projecting portion of the back may be formed with forwardly-extending flanges, which overlap the junction box.

Other features of the invention will be in part apparent from and in part pointed out in the following detail description taken in connection with the accompanying drawings, in which:

Fig. 1 is a bottom plan view of a muzzle shield embodying features of this invention;

Fig. 2 is a section taken on the line 2—2 of Fig. 1, but showing the shield in use;

Fig. 3 is a section taken on the line 3—3 of Fig. 2;

Fig. 4 is an exploded view of the muzzle shield;

Fig. 5 is an oblique view of a conduit clip; and

Figure 6:
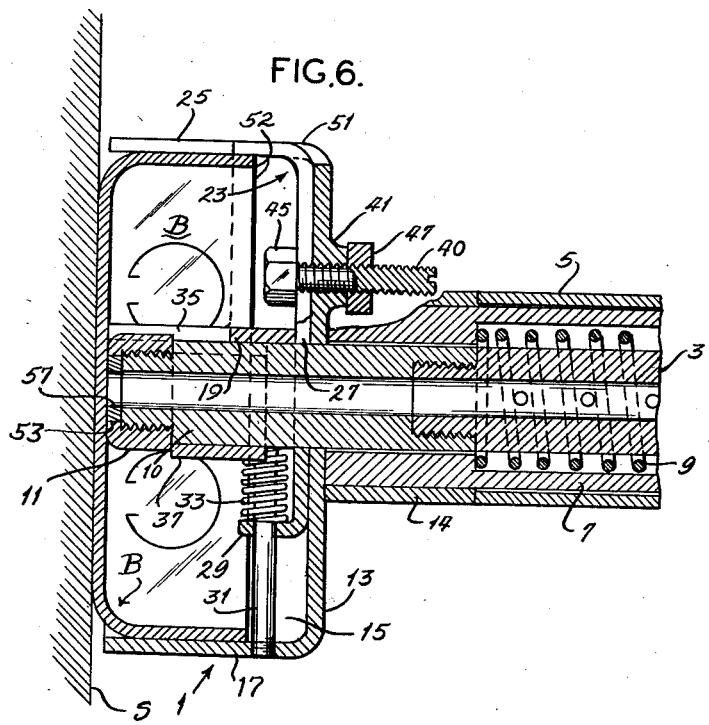
Fig. 6 is a view similar to Fig. 2, but showing the shield as used in attaching a junction box to a supporting surface.

It will be understood that explosively-actuated tools are known to those skilled in the art, and hence are not described in detail. It is sufficient to note that such a tool has a barrel for receiving a penetrating fastener and a cartridge loaded with a charge of propellant. Where a bracket is to be secured against a supporting structure, the muzzle of the tool is pressed against the bracket while the bracket is held against the supporting structure. When the cartridge is fired, the fastener is driven down the barrel, through the bracket and into the supporting structure, so as to become securely imbedded.

One useful application of this type of tool is that of securing holding clips for conduit, pipe or the like. Usually, the clip has a C-shaped section embracing the pipe, which section is joined to a flat projecting ear. The ear is secured against the supporting structure by a penetrating fastener driven by a powder-actuated tool.

Referring now to the drawings, there is shown a muzzle shield, generally designated 1, for use with a powder-actuated tool, such as the one disclosed in the copending application, Serial No. 355,034, filed May 14, 1953 by Kopf, Henning and Marsh for Explosively-Actuated Tools. The tool has a barrel 3, which is axially movable within a barrel housing 5 of somewhat larger cross section. The housing 5, in turn, accommodates a tube 7 holding the muzzle shield 1. Preferably, the tube 7 has a telescoping non-rotary cooperation with the housing. For example, both elements are of polygonal cross section, and a spring 9 is provided to bias the muzzle shield forwardly. The barrel 3 might extend directly into the shield, but in most instances it will be preferable to employ a standard tool, the barrel being lengthened by an extension 10 and the extension having a replaceable cap 11.

More particularly, the muzzle shield 1 is formed as a forwardly-opening chamber of rectangular outline having a back 13, which is apertured to admit the barrel extension 10. The polygonal tube 7 is secured to this back, and a collar 14 serves as a stop between the back 13 of the shield and the housing 5, its length being proportionate to length of the barrel extension 10. Walls 15 and 17 extend forwardly from three sides of the back in spaced relationship from the barrel so as to in part define a blast muffling chamber of volume adequate to handle the largest clip and conduit, which necessarily determines the power of the cartridge. The other side of the chamber is in part defined by a muffling member 19 lying close to the barrel. The ends 20 of muffling member are turned inwardly along opposite sides of the barrel and are secured to the back by ears 22 so as to leave gaps adjacent the sides 15 while providing a muffling action.

The member 19 is formed with a rear edge 21 spaced from the back 13 so as to accommodate a clip-holding bracket, generally designated 23, but otherwise the member extends to the front of the shield. One portion of the bracket extends outwardly from the member and is formed with a forwardly projecting leg 25, whereas the center portion of the bracket is formed with an elongate opening 27. This opening 27 permits transverse movement of the bracket, the bracket otherwise being guided at its inner ends 29 upon a pair of rods 31. Each inner end 29 is turned forwardly and is apertured to admit one of the rods 31, and the rods extend between the walls 17 and 19 on opposite sides of the barrel.

The rods 31 also carry springs 33, which are interposed between the member 19 and the ends 29 of the bracket so as to bias the bracket inwardly. As such, a conduit clip C is gripped between the outer leg 25 of the bracket and the cap 11 of the barrel, the member 19 of the shield being cut away at 35 to accommodate the barrel cap and clip at this point. The barrel extension is confined within a stirrup 37, which is secured at 39 on the inner surface of wall 19. Preferably, the arrangement is one permitting limited axial movement of the barrel, for purposes mentioned in the aforesaid patent application. It will be noted, however, that the cap 11 overhangs the stirrup so as to limit forward movement of the shield. If attempt is made to use the tool with the barrel not perpendicular to the work, the shield moves back while the barrel remains forward, thereby preventing firing, as will be apparent in said prior application.

Another feature of this invention is the provision of elements 40 for holding the conduit of pipe P against its supporting surfaces S independently of the clip C. In particular, the back 13 of the shield projects beyond the end wall 19 as indicated at 41. Threaded bosses 43 are formed on the projecting portion 41 at opposite sides of the bracket, and the conduit-engaging elements 40 may be bolts extending through the bosses. The bolt heads 45 are located between the shield wall 19 and the outer portion of the bracket in a position such as to engage the conduit P at opposite sides of the holding clip C, and the elements are adjustable in a direction parallel to the barrel so as to accommodate different sizes and shapes of conduit. Locking nuts 47 are provided to hold the adjustment.

In use, a conduit clip C is inserted so that the C-section thereof is gripped by the leg 25 of the bracket against the cap 11 of the barrel, with the ear 49 of the clip extending across the muzzle. This ear 49 may or may not be apertured, as will be apparent to those skilled in the art. The muzzle shield is then pressed against the supporting structure S to which the conduit P is to be secured, the spring 9 yielding until the collar 14 engages the end of the barrel housing 5. In positioning the muzzle shield, the C-section of the clip embraces the conduit, and the ear 49 of the clip is pressed against the supporting surface by the end of the barrel. It will be understood that the adjustable elements 40 previously have been set so as to engage the conduit on opposite sides of the clip so as to hold the conduit against the supporting surface. In many types of work, the conduit will be sprung from the supporting surface, and if attempt is made to press it against the surface merely by pressure on the clip, the latter may cock or otherwise become displaced. Necessarily, the elongate opening 27 in the clip-holding bracket is of a size sufficient to accommodate the average run of conduit clips, the bracket being yieldably movable outwardly of the shield to accommodate clips of varying size and shape.

Prior to such manipulation of the tool, a penetrating fastener and cartridge are loaded at the breech end (not shown). When the cartridge is fired, the fastener is driven down the barrel and penetrates both the ear 49 of the clip and the supporting structure S, which may be of concrete, metal, wood or other material. Ports may be provided in the barrel to release the expanding gases in a manner known in the art. Some of the gases will also escape through the muzzle of the barrel, but in the present device, the gases are confined by the muzzle shield, which is of substantial volume. The shield also serves to protect bystanders from spalling of the supporting structure or from a ricocheting projectile. In the device disclosed, it will be noted that the volume of the muzzle shield does not vary with the size of the conduit and that the conduit is protected by the fixed wall 19, except at the recess 35 which is normally closed by the clip C and barrel.

In instances where the device is employed to secure electrical conduit against the supporting wall, it will generally be necessary to provide junction boxes, which are also attached to the supporting wall. It would be inconvenient to require that the shield be removed, hence the invention further contemplates that the muzzle shield will be adaptable to use in attaching junction boxes.

Referring now to Fig. 6, such a box is shown at B. It may be noted that the outwardly extending portion 41 of the back wall is provided with forwardly projecting flanges 51, but these flanges do not extend to the front of the shield. Sufficient space is left to accommodate conduit, as illustrated in Figs. 2 and 3, but the flanges preferably overlap edges 52 of the junction box. As indicated heretofore, the center wall 19 does not extend to the side walls 15, the sides of the junction box being accommodated outwardly of the member 19. In most instances, the conduit-engaging elements 45 will not interfere with insertion of the box, but they may be adjusted rearwardly, if necessary.

In attaching a junction box, it is desirable to utilize a washer 57, as will be understood by those skilled in the art, which washer is held by the muzzle cap 11 within the bore 53 thereof. The junction box itself is held between the leg 25 of the bracket, which is moved outwardly, and the opposite side 17 of the muzzle shield. It will be understood that this shield will accommodate junction boxes of different sizes and shapes, but the variation is limited. The junction box must fit between the sides 15 of the shield and outwardly of the inturned ends 20 of member 19. The fastener is driven directly through the back wall of the box as well as the washer, hence the barrel need not be positioned particularly. Necessarily, the depth of the shield should be sufficient to accommodate the box without interference from the guide rods 31.

It will also be apparent that the described embodiment is readily manufactured and maintained. In assembly, the bracket 23 is entered through the slot 21, and the guide rods 31 are then inserted through suitable openings in the end wall 17, the rods then being secured in position. The muzzle shield is also designed to permit use of this shield on a standard design of explosively-actuated tool when the barrel is lengthened by the extension 10.

From the foregoing description, it is apparent that those skilled in the art will understand the structure, function and mode of operation of the invention herein disclosed, and appreciate the advantages thereof. Although one embodiment has been disclosed in detail, it is to be understood that the invention is not limited thereto, but the drawings and description thereof are to be understood as being merely illustrative. Although the clip-holding bracket is engaged within a slot against the back of the muzzle shield, this bracket may enter the shield at other points. Also, other types of adjustable elements 40 may be employed. It is realized that many modifications and variations will present themselves to those skilled in the art without departing from the spirit of this invention or the scope thereof as set forth in the appended claims.

Having thus described the invention, what is claimed and desired to be secured by Letters Patent is:

1. In an explosively-actuated tool having a barrel and associated muzzle shield for driving fasteners; the improvement that comprises a shield formed as a forwardly-opening blast-muffling cup of substantial volume fixed against lateral movement in position so that a first wall of the cup extends forwardly adjacent the barrel while other wall portions extend forwardly in relatively spaced relationship from the barrel, a clip-holding bracket mounted on said shield for lateral movement in a direction normal to said first wall of the cup, one end of said bracket being formed with a forwardly-projecting leg disposed outwardly from said first wall of the cup opposite the barrel, the opposite end of the bracket being disposed on the opposite side of the barrel, and a spring mounted on the housing and engaging the bracket to bias said opposite end of the bracket away from the barrel.

2. An explosively-actuated tool as set forth in claim 1, further including a conduit-engaging element offset to one side barrel outwardly of said first wall of the cup, said element being carried by the shield for adjustment in a direction parallel to the barrel.

3. An explosively-actuated tool as set forth in claim 1, wherein said first wall of the cup is formed with a slot extending thereacross adjacent the back of the cup, said clip-holding bracket being slidably engaged in said slot and having an elongate opening for admitting the barrel of the tool.

4. An explosively-actuated tool as set forth in claim 1, wherein the cup contains a pair of guide rods extending perpendicular to said first wall on opposite sides of the barrel, the inner end of the bracket being slidably engaged on said rods, and springs compressed on said rods between the inner end of said bracket and said first wall of the cup.

5. An explosively-actuated tool as set forth in claim 1, wherein said cup is formed with a back having a rigidly fixed portion which projects beyond said first wall, and a pair of threaded elements extending forwardly from the projecting portion of the back on opposite sides of the barrel, said threaded elements being clear of the bracket.

6. An explosively-actuated tool as set forth in claim 1, wherein a stirrup is affixed to the shield to accommodate the barrel, and a muzzle cap mounted on the barrel and overhanging said stirrup.

7. An explosively-actuated tool as set forth in claim 1, wherein said barrel is enclosed in a polygonal housing, said shield being affixed to a polygonal tube, and said tube having a telescoping cooperation with the barrel housing.

8. An explosively-actuated tool as set forth in claim 1, wherein said first wall extends between other walls of the cup, the ends of said first wall being spaced from said other two walls, thereby to accommodate a junction box with the sides thereof extending outwardly of the ends of said first wall and within the other walls of the shield.

9. Apparatus as set forth in claim 8, wherein the ends of said first wall are turned inwardly along the opposite sides of the barrel.

References Cited in the file of this patent

UNITED STATES PATENTS

| | | |
|---|---|---|
| 2,673,980 | Ballachey | Apr. 6, 1954 |
| 2,675,546 | Catlin | Apr. 20, 1954 |